US012598304B2

(12) United States Patent
Jang et al.

(10) Patent No.: US 12,598,304 B2
(45) Date of Patent: \*Apr. 7, 2026

(54) IMAGE PROCESSING METHOD, AND DEVICE FOR SAME

(71) Applicant: GUANGDONG OPPO MOBILE TELECOMMUNICATIONS CORP., LTD., Dongguan (CN)

(72) Inventors: Hyeongmoon Jang, Seoul (KR); Junghak Nam, Seoul (KR); Seunghwan Kim, Seoul (KR); Jaehyun Lim, Seoul (KR)

(73) Assignee: GUANGDONG OPPO MOBILE TELECOMMUNICATIONS CORP., LTD., Dongguan (CN)

( \* ) Notice: Subject to any disclaimer, the term of this patent is extended or adjusted under 35 U.S.C. 154(b) by 0 days.

This patent is subject to a terminal disclaimer.

(21) Appl. No.: 19/001,833

(22) Filed: Dec. 26, 2024

(65) Prior Publication Data

US 2025/0142075 A1     May 1, 2025

Related U.S. Application Data

(63) Continuation of application No. 18/542,173, filed on Dec. 15, 2023, now Pat. No. 12,219,145, which is a
(Continued)

(51) Int. Cl.
*H04N 19/00* (2014.01)
*H04N 19/119* (2014.01)
(Continued)

(52) U.S. Cl.
CPC ........... *H04N 19/13* (2014.11); *H04N 19/119* (2014.11); *H04N 19/124* (2014.11); *H04N 19/176* (2014.11); *H04N 19/61* (2014.11)

(58) Field of Classification Search
CPC ....................................................... H04N 19/00
See application file for complete search history.

(56) References Cited

U.S. PATENT DOCUMENTS

2015/0172658 A1\* 6/2015 Kim ..................... H04N 19/625
2019/0052876 A1\* 2/2019 Lee ...................... H04N 19/157
2019/0208203 A1\* 7/2019 Tsukuba ................. H04N 19/46

OTHER PUBLICATIONS

INPI, Office Action for BR Application No. 112019013831-5, Jan. 13, 2025.

\* cited by examiner

*Primary Examiner* — Maryam A Nasri
(74) *Attorney, Agent, or Firm* — Hodgson Russ LLP

(57) ABSTRACT

The present invention discloses a method for encoding/decoding a video signal and an apparatus for the method. More specifically, a method for decoding a video signal comprises generating a residual block of a current block by performing entropy decoding on the video signal; if size of the current block is smaller than a predetermined first size, parsing a transform skip flag which indicates whether a transform skip is applied to the current block; determining whether to parse a primary transform flag which indicates whether a primary transform is applied to the current block; if it is determined to parse the primary transform flag, parsing the primary transform flag; and if the primary transform flag indicates that a primary transform is applied to the current block, generating a primary inverse transformed transform block of the current block by performing a primary inverse transform to the residual block.

20 Claims, 9 Drawing Sheets

Related U.S. Application Data continuation of application No. 17/851,953, filed on Jun. 28, 2022, now Pat. No. 11,882,286, which is a continuation of application No. 16/476,033, filed as application No. PCT/KR2017/015590 on Dec. 27, 2017, now Pat. No. 11,394,974.

(60) Provisional application No. 62/446,535, filed on Jan. 16, 2017, provisional application No. 62/441,588, filed on Jan. 3, 2017.

(51) Int. Cl.

| | |
|---|---|
| *H04N 19/124* | (2014.01) |
| *H04N 19/13* | (2014.01) |
| *H04N 19/176* | (2014.01) |
| *H04N 19/61* | (2014.01) |

| Set | Hor. | Ver. | P-mode (35) | P-mode (67) |
|---|---|---|---|---|
| Set0 | DST7, DCT5 comb. (total4) | | 0 | 0 |
| Set1 | DST7, DCT5 comb. (total4) | | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
| Set2 | DST7, DCT5 comb. (total4) | | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
| Set3 | DST7 | DST7 | 8, 9, 10, 11, 12 (Neighboring angles to horizontal directions) | 14, 15, 16, 17, 18, 19, 20, 21, 22 (Neighboring angles to horizontal directions) |
| Set3 | DCT5 | DST7 | | |
| Set3 | DST7 | DCT8 | | |
| Set3 | DCT5 | DCT8 | | |
| Set4 | DST7 | DST7 | 24, 25, 26, 27, 28 (Neighboring angles to vertical directions) | 46, 47, 48, 49, 50, 51, 52, 53, 54 (Neighboring angles to vertical directions) |
| Set4 | DST7 | DCT5 | | |
| Set4 | DCT8 | DST7 | | |
| Set4 | DCT8 | DCT5 | | |

503     501     502

| Primary transform | Y component | Cb component | Cr component |
| --- | --- | --- | --- |
| Off (not apply) | Transmit | Transmit | Transmit |
| On (apply) | – | Transmit | Transmit |

| Primary transform | Y component | Cb component | Cr component |
| --- | --- | --- | --- |
| Off (not apply) | Transmit | Transmit | Transmit |
| On (apply) | – | – | – |

Fig. 12

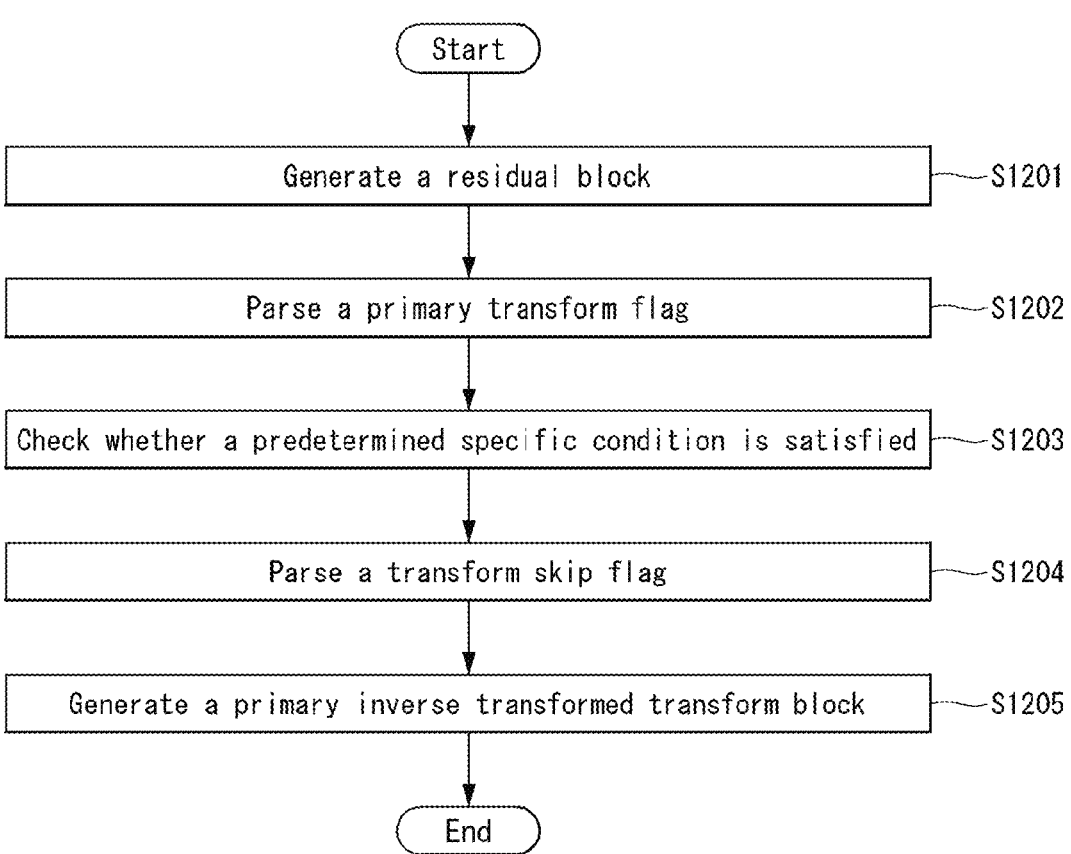

Start

Generate a residual block ——S1201

Parse a primary transform flag ——S1202

Check whether a predetermined specific condition is satisfied ——S1203

Parse a transform skip flag ——S1204

Generate a primary inverse transformed transform block ——S1205

End

Fig. 13

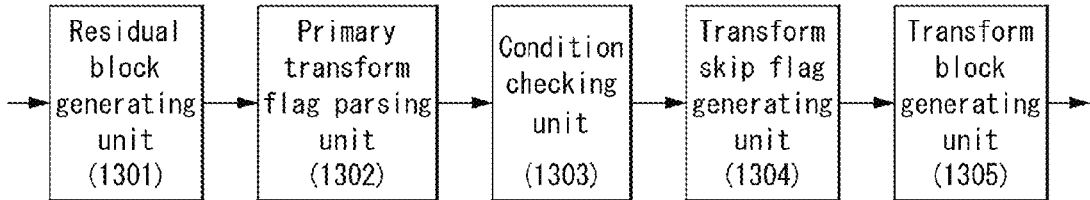

| Residual block generating unit (1301) | Primary transform flag parsing unit (1302) | Condition checking unit (1303) | Transform skip flag generating unit (1304) | Transform block generating unit (1305) |

IMAGE PROCESSING METHOD, AND DEVICE FOR SAME

CROSS-REFERENCE TO RELATED APPLICATIONS

This application is a continuation of U.S. application Ser. No. 18/542,173, filed on Dec. 15, 2023, which is a continuation of U.S. application Ser. No. 17/851,953, filed on Jun. 28, 2022, now U.S. Pat. No. 11,882,286, which is a continuation of U.S. application Ser. No. 16/476,033, filed on Jul. 3, 2019, now U.S. Pat. No. 11,394,974, which is a National Stage application under 35 U.S.C. § 371 of International Application No. PCT/KR2017/015590, filed on Dec. 27, 2017, which claims the benefit of U.S. Provisional Application No. 62/446,535, filed on Jan. 16, 2017, and U.S. Provisional Application No. 62/441,588, filed on Jan. 3, 2017. The entire disclosures of the aforementioned applications are incorporated herein by reference.

TECHNICAL FIELD

The present invention relates to a method and apparatus for encoding/decoding a video signal and, more particularly, to a method for encoding/decoding a video signal, which improves transform-related syntax coding and an apparatus for supporting the method.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

SUMMARY

To solve the problem above, an object of the present invention is to provide a method for effectively signaling a flag which determines whether to apply a transform and an index which determines the type of the transform (or a transform kernel).

Also, an object of the present invention is to provide a method for effectively signaling a flag which determines whether to apply a primary transform and a flag which determines whether to apply a transform skip.

Also, an object of the present invention is to provide a method for referencing context to perform entropy coding on a flag which determines whether to apply a primary transform.

Also, an object of the present invention is to provide a method for determining whether to transmit (or parse) a transform skip flag according to a primary transform flag value in a compression structure where a coding unit is not distinguished from a transform unit.

Technical objects to be achieved by the present invention are not limited to those described above, and other technical objects not mentioned above may also be clearly understood from the descriptions given below by those skilled in the art to which the present invention belongs.

According to one aspect of the present invention, a method for decoding a video signal may comprise generating a residual block of a current block by performing entropy decoding on the video signal; parsing a transform skip flag which indicating whether a transform skip is applied to the current block when size of the current block is smaller than a predetermined first size; determining whether to parse a primary transform flag which indicates whether a primary transform is applied to the current block; parsing the primary transform flag when it is determined to parse the primary transform flag; and generating a primary inverse transformed transform block of the current block by performing a primary inverse transform to the residual block when the primary transform flag indicates that a primary transform is applied to the current block.

Preferably, the step of determining whether to parse the primary transform flag may parse the primary transform flag when the transform skip flag is 0.

Preferably, the step of determining whether to parse the primary transform flag may determine to parse the primary transform flag when size of the current block is smaller than a predetermined second size, and the transform skip flag is 0.

Preferably, the step of determining whether to parse the primary transform flag may determine to parse the primary transform flag when the current block is a luma block, size of the current block is smaller than a predetermined second size, and the transform skip flag is 0.

Preferably, the step of parsing the transform skip flag may include checking whether a non-zero transform coefficient exists in the current block and if it is determined from the checking result that the non-zero transform coefficient exists in the current block, parse the transform skip flag.

Preferably, the primary transform flag may be entropy-decoded by referencing context determined according to depth of the current block, size of the current block, or number of pixels within the current block in a QuadTree plus BinaryTree (QTBT) block split structure.

According to another one aspect of the present invention, a method for decoding a video signal may comprise generating a residual block of a current block by performing entropy decoding on the video signal; parsing a primary transform flag which indicates whether a primary transform is applied to the current block; checking whether the current block satisfies a predetermined specific condition; if it is determined from the checking result that the specific condition is satisfied, parsing a transform skip flag indicating whether a transform skip is applied to the current block; and if the transform skip flag indicates that a transform skip is not applied to the current block, generating a primary inverse transformed transform block of the current block by performing a primary inverse transform on the residual block.

Preferably, the specific condition may include whether the primary transform flag is 0 and whether size of the current block is smaller than or equal to the maximum size to which a transform skip is applied.

Preferably, the maximum size to which the transform skip is applied may be determined according to a slice of the current block.

Preferably, the specific condition may further include whether the current block is a chroma component.

Preferably, the specific condition may further include whether a slice of the current block is a B-slice.

Preferably, the specific condition may further include whether size of the current block or number of pixels of the current block belongs to a specific range.

According to yet another aspect of the present invention, an apparatus for decoding a video signal may comprise a residual block generating unit for generating a residual block of a current block by performing entropy decoding on the video signal; a primary transform flag parsing unit for parsing a primary transform flag which indicates whether a primary transform is applied to the current block; a condition checking unit for checking whether the current block satisfies a predetermined specific condition; a transform skip flag parsing unit for indicating whether a transform skip is applied to the current flag if the specific condition is satisfied; and an inverse transformed transform block generating unit for generating a primary inverse transformed transform block of the current block by performing a primary inverse transform on the residual block if the transform skip flag indicates that a transform skip is not applied to the current block.

According to an embodiment of the present invention, the number of signaling bits may be reduced and compression performance may be improved by optimizing a condition for transmitting a flag for determining whether to apply a transform and an index for determining the transform type.

Also, according to an embodiment of the present invention, by effectively signaling a primary transform and a transform skip, redundant syntax coding may be avoided and compressed video quality may be maintained while a compression efficiency is improved at the same time.

The technical effects of the present invention are not limited to the technical effects described above, and other technical effects not mentioned herein may be understood to those skilled in the art to which the present invention belongs from the description below.

DESCRIPTION OF DRAWINGS

The accompanying drawings, which are included herein as a part of the description for help understanding the present invention, provide embodiments of the present invention, and describe the technical features of the present invention with the description below.

FIG. 5 illustrates a method for determining a transform kernel according to an intra-prediction mode, as an embodiment to which the present invention may be applied.

FIG. 12 illustrates a method for decoding a video signal according to one embodiment of the present invention.

FIG. 13 illustrates an apparatus for decoding a video signal according to one embodiment of the present invention.

DETAILED DESCRIPTION

Figure 1:
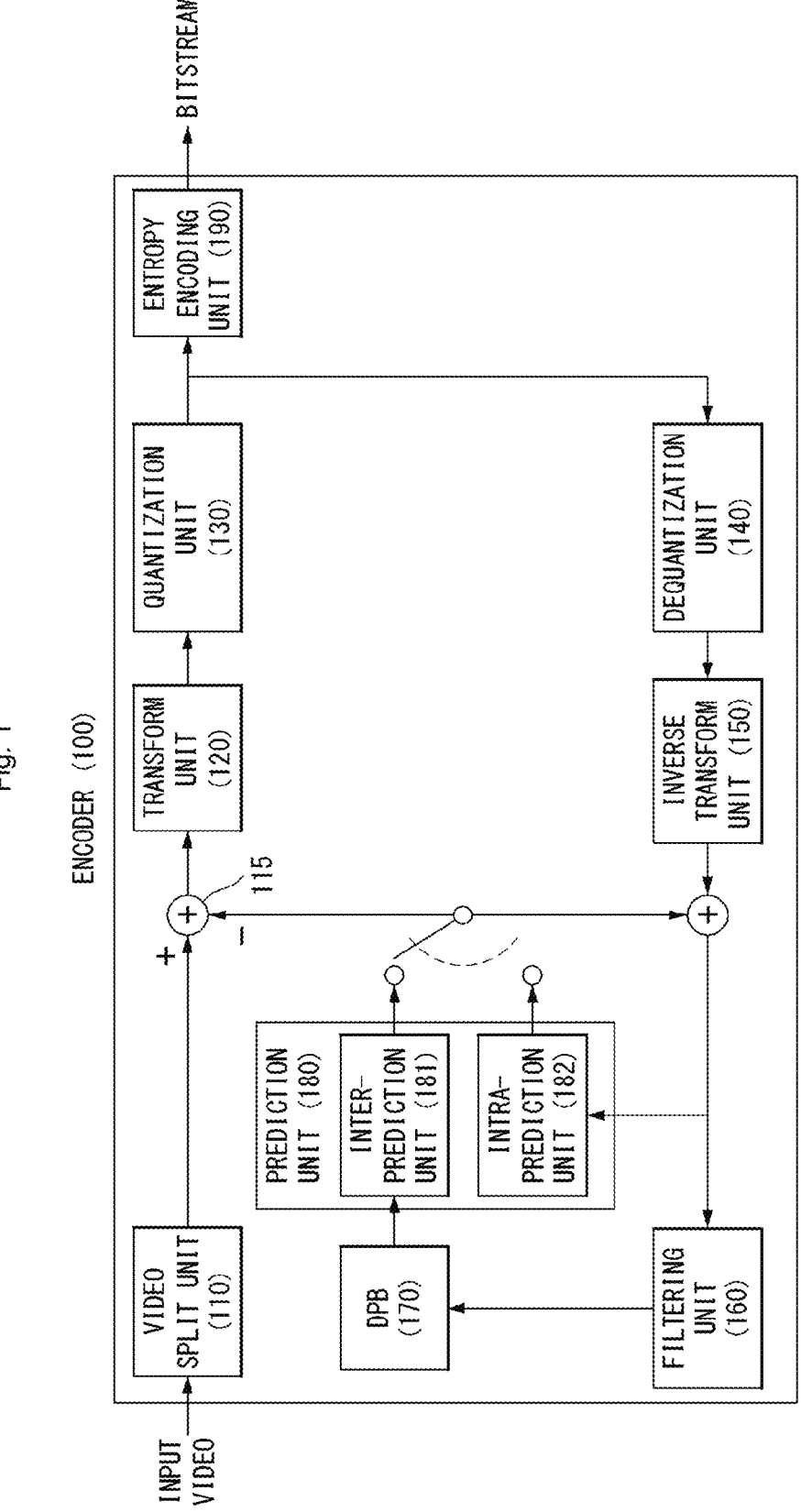
FIG. 1 illustrates a schematic block diagram of an encoder in which the encoding of a still image or video signal is performed, as an embodiment to which the present invention is applied.

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in this specification, a "processing unit" means a unit in which an encoding/decoding processing process, such as prediction, transform and/or quantization, is performed. Hereinafter, for convenience of description, a processing unit may also be called a "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PB) or transform block (TB) for a chroma component. Furthermore, the present invention is not limited thereto, and a processing unit may be construed as a meaning including a unit for a luma component and a unit for a chroma component.

Furthermore, a processing unit is not essentially limited to a square block and may be constructed in a polygon form having three or more vertices.

Furthermore, hereinafter, in this specification, a pixel, a picture element, etc. are collectively called a sample. Furthermore, to use a sample may mean to use a pixel value, a picture element value or the like.

FIG. 1 illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequantization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy. In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Furthermore, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

Figure 2:
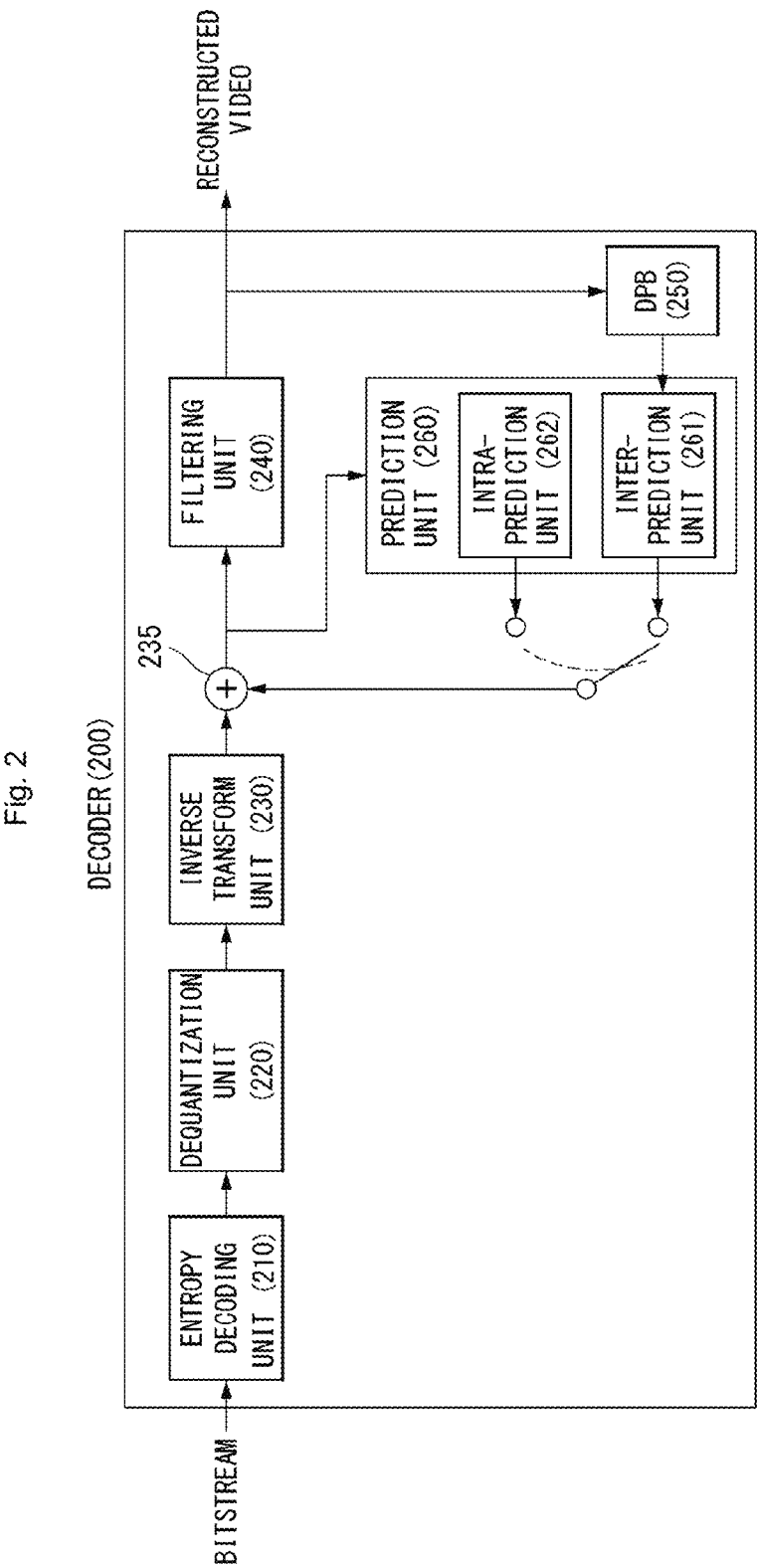
FIG. 2 illustrates a schematic block diagram of a decoder in which decoding of a still image or video signal is performed, as an embodiment to which the present invention is applied.

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

Processing Unit Split Structure

In general, a block-based image compression method is used in the compression technique (e.g., HEVC) of a still image or a video. The block-based image compression method is a method of processing an image by splitting it into specific block units, and may decrease memory use and a computational load.

Figure 3:
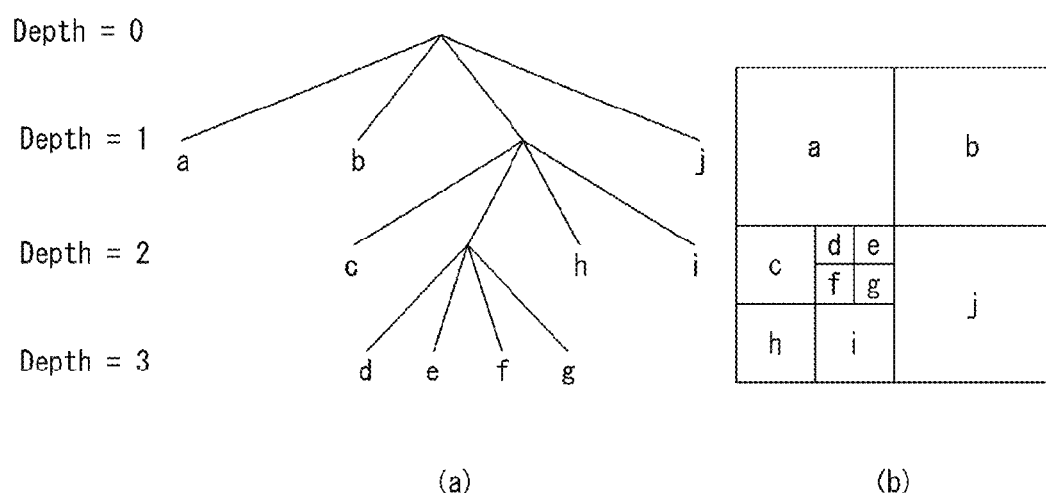
FIG. 3 is a diagram for describing a split structure of a coding unit that may be applied to the present invention.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0)

value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(*b*), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(*b*), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(*b*), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

Figure 4:
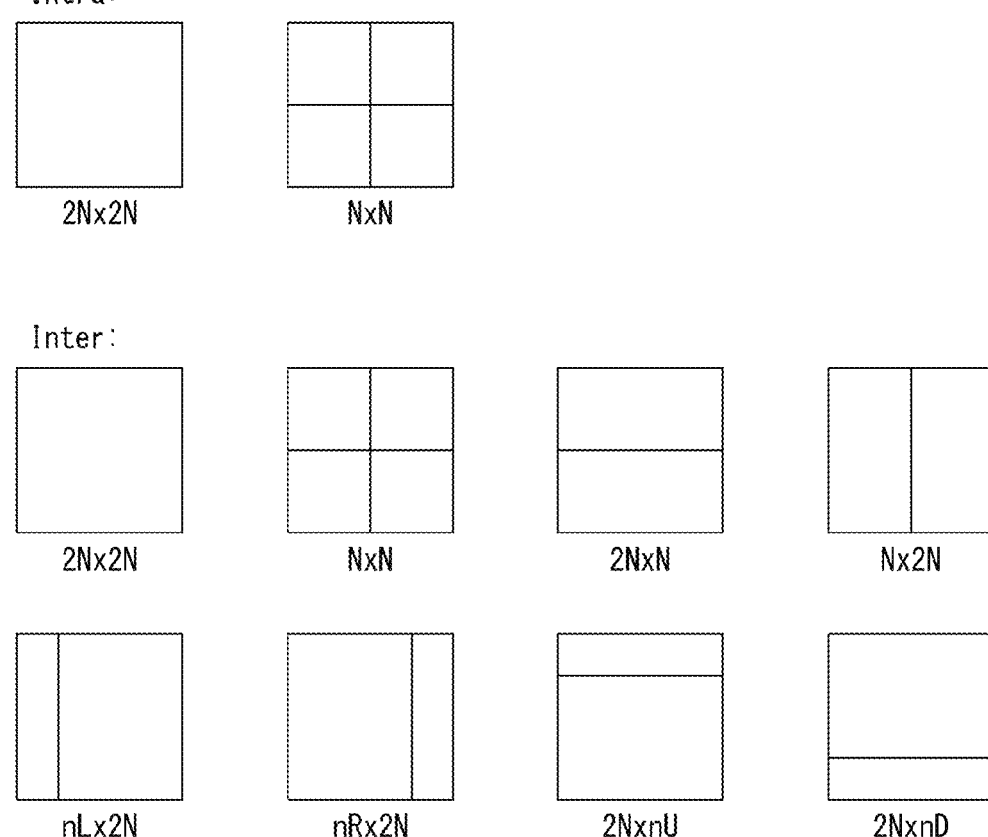
FIG. 4 illustrates a prediction unit that may be applied to the present invention.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and I have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a TU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Adaptive Multiple Transform (AMT)

A residual signal acquired through prediction within a video frame (or intra-prediction) may exhibit different statistical characteristics according to a prediction mode within the video frame. Therefore, for each intra-prediction mode, an encoder/decoder may apply various transforms rather than a normal transform employed for conventional video coding techniques such as DCT-2.

In the present invention, AMT refers to a method for determining a transform adaptively based on an intra-prediction mode or inter-prediction mode. AMT is not limited to that term but may be referred to as an enhanced multiple transform (EMT), primary transform, or core transform.

FIG. 5 illustrates a method for determining a transform kernel according to an intra-prediction mode, as an embodiment to which the present invention may be applied.

Referring to FIG. 5, when the number of intra-prediction modes is 35 (501) or 67 (502), an encoder/decoder may group the intra-prediction modes into prediction mode groups including one or more prediction modes and determine (or map) a transform set for each intra-prediction mode group. In other words, a different transform set may be applied to each intra-prediction mode group. In this case, each transform set may be composed of a total of four combinations of column-wise and row-wise transforms. For example, in the transform set 0 (503), since DST-7 and DCT-5 may be applied for all of the column-wise and row-wise transforms, a total of four combinations is possible.

Since a total of four transform kernel combinations may be applied for each intra-prediction mode, an encoder may transform an index for selecting one of the four combinations (in what follows, it is called an 'AMT index') to a decoder. Also, besides the transform kernels shown in FIG. 5, due to the nature of a residual signal, it may be often the case that DCT-2 is an optimal transform for both the row and column directions. Therefore, the encoder may signal a flag which indicates whether AMT is applied (in what follows, it is called an 'AMT flag') to the decoder.

If the AMT flag is 0, the decoder may apply DCT-2 for both the row and column directions, and if the AMT flag is 1, the decoder may parse the AMT index to select (or determine) one of the four combinations.

Also, if the AMT flag is 0, and the number of transform coefficients of a currently processed block is smaller than 3, the decoder may apply DST-7 to both the row and column directions instead of applying the transform kernels shown in FIG. 5. In other words, the decoder first parses transform coefficients and if it is confirmed that the number of transform coefficients is smaller than 3, may apply DST-7 for both the row and column directions instead of parsing the AMT index. By doing so, costs for signaling additional information related to the transform kernel may be reduced.

In one embodiment, AMT may be applied only to the case where the size of a currently processed block is smaller than a predetermined specific size. For example, AMT may be applied only to the case where both of the width and height of a currently processed block is smaller than or equal to 32.

In what follows, descriptions of the present invention are given mainly for a case where primary transform (or core transform) is used as the AMT, but the present invention is not limited to the specific descriptions. In other words, in applying a method proposed in the present specification, various primary transform techniques in addition to the AMT may be used.

In the conventional video coding technology, while a transform skip flag is transmitted in transform units, an AMT flag is transmitted in coding units. Here, a transform skip flag indicates whether to skip a transform without performing the transform to the corresponding block. However, if the two flags are always transmitted in a compression structure such as the QuadTree plus BinaryTree (QTBT) block structure where a coding unit is not distinguished from a transform unit, compression performance may be degraded due to redundant syntax signaling.

Therefore, to solve the problem above, the present invention proposes a method for effectively signaling a flag which determines whether to apply a transform and an index which determines the type of the transform type (or transform kernel).

Also, the present invention proposes a method for effectively signaling a flag which determines whether to apply a primary transform and a flag which determines whether to apply a transform skip.

Also, the present invention proposes a method for referencing context to perform entropy coding on the flag which determines whether to apply a primary transform.

Also, the present invention proposes a method for determining whether to transmit (or parse) a transform skip flag according to a primary transform flag value in a compression structure where a coding unit is not distinguished from a transform unit.

Also, the present invention proposes a method for determining whether to transmit a transform skip flag for each component based on a primary transform flag.

According to an embodiment of the present invention, the number of signaling bits may be reduced and compression performance may be improved by optimizing a condition for transmitting a flag for determining whether to apply a transform and an index for determining the transform type.

Also, according to an embodiment of the present invention, by effectively signaling a primary transform and a transform skip, redundant syntax coding may be avoided and compressed video quality may be maintained while a compression efficiency is improved at the same time.

In what follows, a processing block refers to a unit (or block) where an encoding/decoding process such as prediction, transformation and/or quantization is performed, and for the convenience of descriptions, it may also be called a block or processing unit. Also, when a transform process is used as a processing unit, the processing block may be called a coding block, coding unit, transform block, or transform unit.

Embodiment 1

According to an embodiment of the present invention, an encoder/decoder may limit a condition for transmitting a flag which determines whether to apply a primary transform by using a transform skip flag.

As described above, an encoder may signal a flag which indicates whether the AMT is applied (in what follows, it is called an 'AMT flag') to a decoder. At this time, as in the conventional video coding technology, if an AMT flag is signaled for the whole blocks, bits are unnecessarily consumed, which may lead to degradation of compression performance. Therefore, an encoder may minimize the amount of bit use by transmitting the AMT flag only under a specific condition.

Embodiment 1-1

In one embodiment of the present invention, an encoder may signal the AMT flag to a decoder for all of the blocks the transform skip flag of which is 0. Here, the transform skip flag indicates whether to skip a transform without performing the transform on the corresponding block.

If the transform skip flag is 1, the residual signal transmitted from an encoder may be scaled YUV data rather than quantized YUV data. In this case, since a transform is not performed, the encoder doesn't have to additionally signal the AMT flag which indicates whether to apply the AMT to the decoder.

Therefore, if the transform skip flag is 1, the encoder may reduce the amount of additional information that have to be transmitted additionally by not transmitting the AMT flag. The method proposed in the present embodiment may be applied not only to a method for signaling an AMT flag but also to other method for signaling a primary transform. In other words, when a transform skip flag is 1, the encoder may not transmit a flag which indicates whether to apply a primary transform to the decoder.

Figure 6:
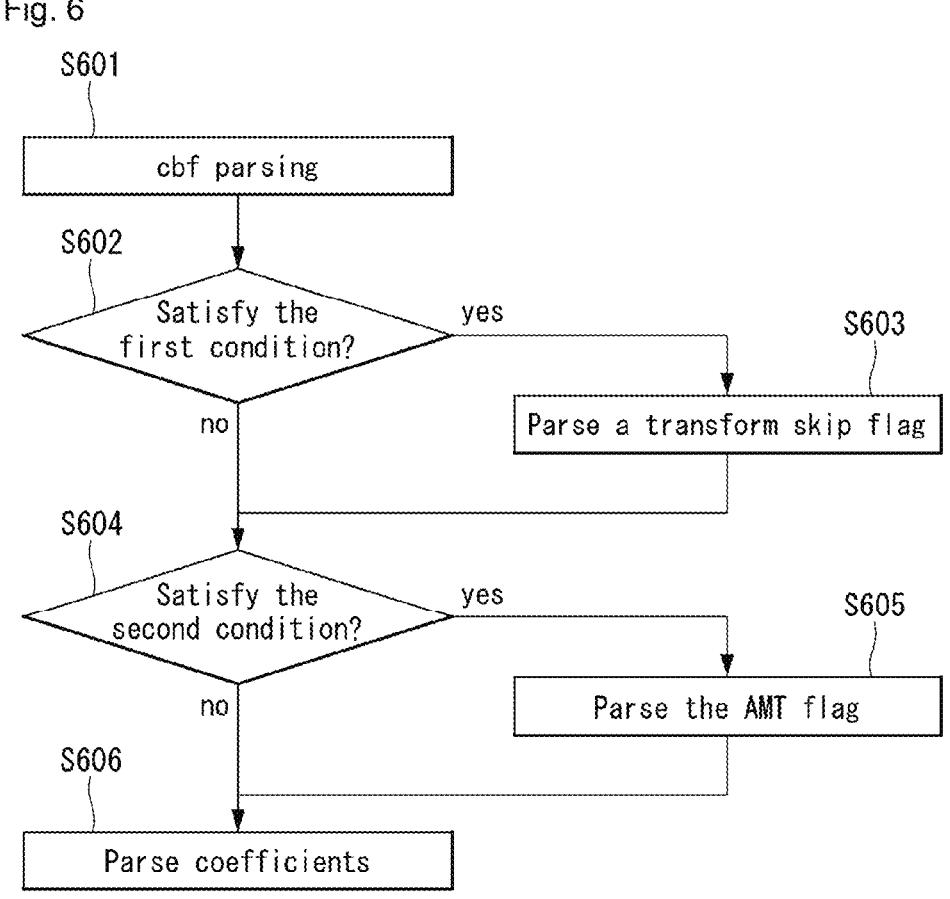
FIG. 6 illustrates a condition for parsing an AMT flag, as an embodiment to which the present invention is applied.

FIG. 6 illustrates a condition for parsing an AMT flag, as an embodiment to which the present invention is applied.

Although the present embodiment mainly describes a decoder for the sake of convenience, a method for parsing an AMT flag under a specific condition as proposed in the present embodiment may be applied to both of an encoder and a decoder.

Referring to FIG. 6, a decoder parses a coded bit flag (CBF) which indicates existence of a non-zero coefficient in a residual block of a currently processed block S601.

The decoder determines whether a currently processed block satisfies a first condition S602 and if the currently processed block satisfies the first condition, parses a transform skip flag which indicates whether a transform skip is applied to the currently processed block S603. In other words, the transform skip flag may be parsed according to whether a currently processed block satisfies a specific condition.

Here, whether the first condition is satisfied may be determined according to the size of a currently processed block. In other words, if the size of a currently processed block is smaller than or equal to a predetermined size, the first condition may be satisfied. For example, the first condition may include whether the width and height of a current block are smaller than or equal to 4.

The decoder determines whether a currently processed block satisfies a second condition S604 and if the currently processed block satisfies the second condition, parses an AMT flag which indicates whether AMT is applied S605. In other words, the decoder may parse the AMT flag only when a currently processed block satisfies a specific condition. Here, the second condition may include whether the value of the transform skip flag parsed at the S603 step is 0. Also, the second condition may include whether the CBF value parsed at the S601 step is 1 and/or whether both of the width and height of a currently processed block are smaller than or equal to 64.

Afterwards, the decoder parses transform coefficients of a currently processed block S606.

Embodiment 1-2

One embodiment of the present invention proposes a method for determining whether to transmit a primary transform flag based on a transform skip flag when the transform skip flag is transmitted for each component.

An encoder may transmit a transform skip flag to a decoder for each of luma component (or Y component) and chroma components (C and Cr components). Therefore, since the transform skip flag may be transmitted for each component, whether to apply a transform skip may be determined differently for each component. At this time, the encoder may signal to a decoder only when a transform skip is not applied to a component to which a primary transform is actually applied during a process for signaling a flag which indicates whether a primary transform is applied.

For example, since AMT may be applied only for the luma component, the encoder may signal the AMT flag only when a transform skip is not applied to the luma component. On the other hand, the encoder may not signal the AMT flag irrespective of application of the transform skip in the case of chroma components (namely Cb and Cr components).

Figure 7:
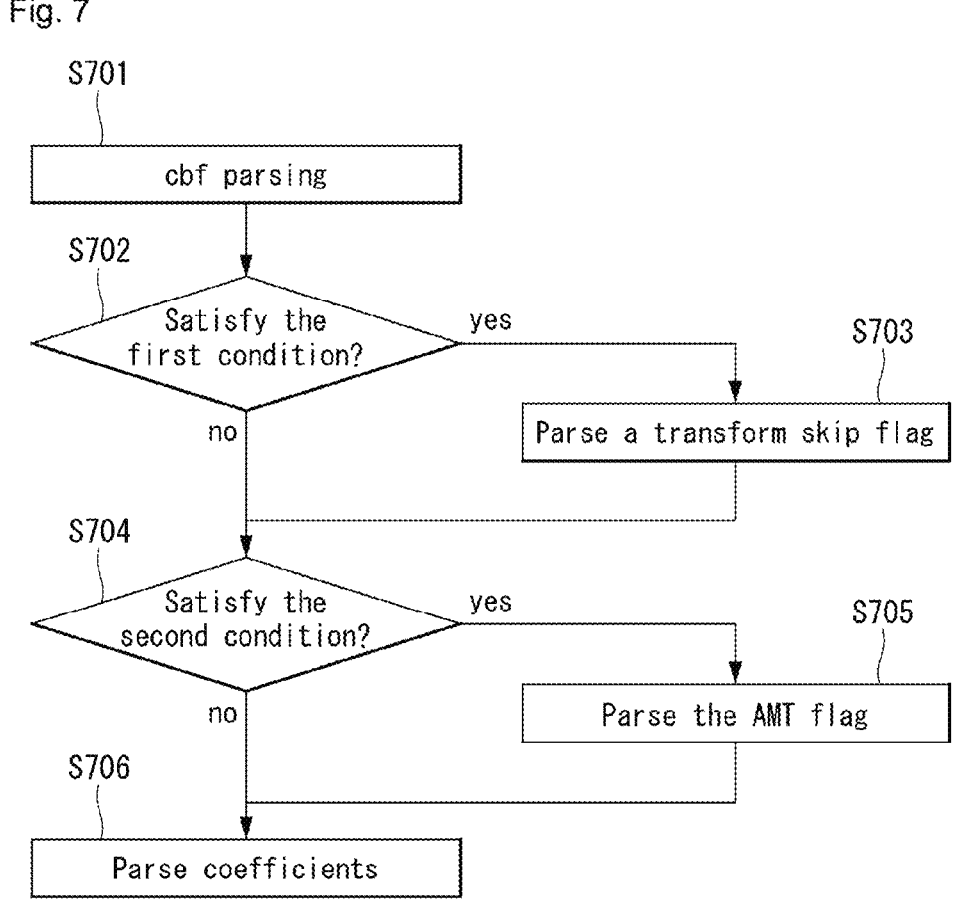
FIG. 7 illustrates a condition for parsing an AMT, as an embodiment to which the present invention is applied.

FIG. 7 illustrates a condition for parsing an AMT, as an embodiment to which the present invention is applied.

Although the present embodiment mainly describes a decoder for the sake of convenience, a method for parsing an AMT flag under a specific condition as proposed in the present embodiment may be applied to both of an encoder and a decoder.

Referring to FIG. 7, a decoder parses a coded bit flag (CBF) which indicates existence of a non-zero coefficient in a residual block of a currently processed block S701.

The decoder determines whether a currently processed block satisfies a first condition S702 and if the currently processed block satisfies the first condition, parses a transform skip flag which indicates whether a transform skip is applied to the currently processed block S703. In other words, the transform skip flag may be parsed according to whether a currently processed block satisfies a specific condition.

Here, whether the first condition is satisfied may be determined according to the size of a currently processed block. In other words, if the size of a currently processed block is smaller than or equal to a predetermined size, the first condition may be satisfied. For example, the first condition may include whether the width and height of a current block are smaller than or equal to 4.

The decoder determines whether a currently processed block satisfies a second condition S704 and if the currently processed block satisfies the second condition, parses an AMT flag which indicates whether AMT is applied S705. In other words, the decoder may parse the AMT flag only when a currently processed block satisfies a specific condition. Here, the second condition may include whether a currently processed block corresponds to the luma component. Also, the second condition may include whether the value of the transform skip flag parsed at the S703 step is 0. Also, the second condition may include whether the CBF value parsed at the S701 step is 1 and/or whether both of the width and height of a currently processed block are smaller than or equal to 64.

Afterwards, the decoder parses transform coefficients of a currently processed block S706. As described above, the method proposed in the present embodiment may be applied not only to a method for signaling an AMT flag but also to other method for signaling a primary transform.

Embodiment 1-3

In one embodiment of the present invention, an encoder/decoder may limit a syntax coding condition of a transform skip flag which depends on a cbf value.

More specifically, an encoder may signal a transform skip flag which indicates whether a transform skip is applied to a decoder only when the cbf value is 1. In this case, the first condition applied in the same way to FIGS. 6 and 7 may be expressed by Eq. 1 as follows.

$$\text{Condition 1: } (Cbf \,\&\&\, (\text{width} <= 4 \,\&\&\, \text{height} <= 4)) \qquad \text{[Eq. 1]}$$

In other words, the first condition described with reference to FIGS. 6 and 7 may include whether the cbf value is 1 and whether the width and height of a currently processed block is smaller than or equal to 4.

Also, in the QTBT structure, a currently processed block may have various forms (namely, a non-square block). Therefore, in one embodiment, a condition for transmitting/parsing a transform skip flag may be expressed by Eq. 2 or 3 below by considering various block sizes or shapes.

$$\text{Condition 1: } (Cbf \,\&\&\, (\text{width} <= M \,\&\&\, \text{height} <= N)) \qquad \text{[Eq. 3]}$$

Referring to Eq. 3, an encoder/decoder may configure a specific threshold value for each of the width and height of a current block and determine whether the width and height are larger than the respective threshold values. Here, M and N represent specific threshold values for width and height, respectively, which may be predetermined positive integers.

$$\text{Condition 1: } (Cbf \,\&\&\, (\text{width} * \text{height} <= K)) \qquad \text{[Eq. 4]}$$

Referring to Eq. 4, an encoder/decoder may determine whether a multiplication of the width and height of a currently processed block, namely the number of pixels belonging to the currently processed block is larger than a specific number and determine whether to transmit or parse a transform skip flag. Here, K represents a specific number of pixels belonging to a currently processed block, which may be a predetermined positive integer.

Embodiment 2

According to one embodiment of the present invention, to perform entropy encoding/decoding on a flag which indicates whether to apply a primary transform, an encoder/decoder may determine (or reference) context (or context model) of context-based adaptive binary arithmetic coding (CABAC) based on a block split structure or information of a block size.

More specifically, when performing CABAC on a flag which determines on/off of a primary transform, an encoder/ decoder may reference context determined according to a split depth of a currently processed block.

To give an example with respect to the QTBT split structure, a context index may be determined by using Eq. 5 below for the transform skip flag or AMT flag described in the embodiment 1.

$$\text{Context Index} = ((QT \text{ Depth}) << 1 + (BT \text{ Depth})) >> 1 \qquad \text{[Eq. 5]}$$

As shown in Eq. 5, context used for entropy coding of a current flag may be expressed by a function of QT and BT depths. Here, QT depth represents a split depth of a currently processed block in a quad-tree structure. The root node of a quad-tree may have a QT depth value of 0. And BT depth represents a split depth of a currently processed block in a binary tree structure. In the same way, the root node of a binary tree may have a BT depth value of 0. The root node block of a binary tree may be a leaf node block of a quad-tree structure.

Statistically, it is observed that an AMT flag value has a dependency on the QT and BT depths. A coding efficiency may be improved by determining context used for entropy coding of the AMT flag by taking into account the dependency of the AMT flag on the split depth.

Also, when performing CABAC on a flag which determines on/off of a primary transform, an encoder/decoder may determine context by using the size information of a currently processed block. For example, as shown in Table 1 below, an encoder/decoder may determine context according to the number of pixels within a currently processed block and perform entropy encoding/decoding by referencing the determined context.

TABLE 1

| Number of Pixels (#) | Context index |
|---|---|
| $4096 \leq \#$ | 0 |
| $2048 \leq \# < 096$ | 1 |
| $1024 \leq \# < 2048$ | 2 |
| $512 \leq \# < 1024$ | 3 |
| $256 \leq \# < 512$ | 4 |
| $128 \leq \# < 256$ | 5 |
| $64 \leq \# < 128$ | 6 |
| $32 \leq \# < 64$ | 7 |
| $16 \leq \# < 32$ | 8 |

Although descriptions of the present embodiment are given mainly with respect to the QTBT structure, the present invention is not limited to the specific descriptions but may be applied to various other block split structures in the same manner.

Embodiment 3

In one embodiment of the present invention, an encoder/decoder may determine signaling of a transform skip flag based on a primary transform flag which indicates whether to apply a primary transform. In particular, in one embodiment, the encoder/decoder may determine signaling of a transform skip flag according to the primary transform flag in a split structure where a coding unit is not distinguished from a transform unit as in the QTBT structure.

More specifically, when the primary transform flag in the QTBT structure is 1, an encoder may not transform a transform skip flag to a decoder. By doing so, redundant syntax signaling between a flag which controls on/off of a primary transform and a flag which controls not to perform a transform may be removed.

Figures 8, 9, 10:
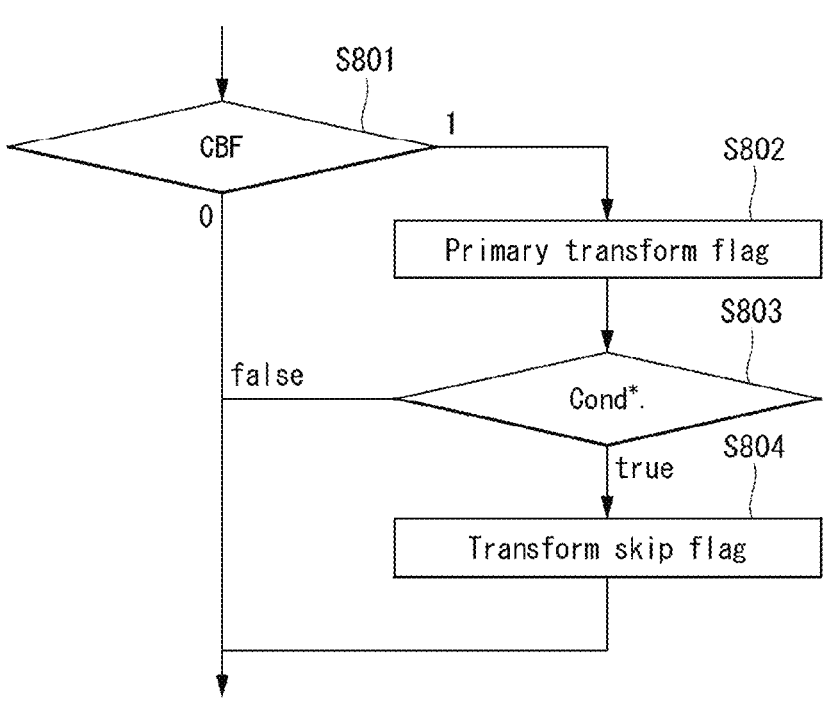
FIG. 8 illustrates a flow diagram of a method for decoding a primary transform flag and a transform skip flag, as an embodiment to which the present invention is applied.
FIG. 9 is a table illustrating whether to transmit a transform skip flag for each component according to whether a primary transform is applied, as an embodiment to which the present invention is applied.
FIG. 10 is a table illustrating whether to transmit a transform skip flag for each component according to whether a primary transform is applied, as an embodiment to which the present invention is applied.

FIG. 8 illustrates a flow diagram of a method for decoding a primary transform flag and a transform skip flag, as an embodiment to which the present invention is applied.

A decoder parses cbf which indicates existence of a non-zero coefficient in a residual block of a currently processed block S801.

If the cbf parsed at the S801 step is 1, the decoder parses a primary transform flag which indicates whether a primary transform is applied S802. And the decoder determines whether the currently processed block satisfies the first condition S803.

If it is found from the determination result of the S803 step that the currently processed block satisfied the first condition, a transform skip flag is parsed S804. Here, the first condition may include whether the currently processed block is smaller than or equal to a predetermined size. Similarly, the first condition may include whether a multiplication of the width and height of the currently processed block is smaller than or equal to a predetermined value. And the predetermined size or predetermined value may be configured differently for each slice. For example, the predetermined size or predetermined value may be configured differently for I and non-I slices.

According to the first condition, a problem may occur that a transform skip flag may be signaled redundantly even when a primary transform is applied to a currently processed block. Therefore, to solve the problem above, the first condition may include whether the primary transform flag parsed at the S802 step is 1.

In other words, if the size of the current block is smaller than or equal to a predetermined size, and the value of a received primary transform flag is not 1, the encoder may parse the transform skip flag. If the size of a current block is larger than a predetermined size, or the value of a received primary transform flag is 1, the decoder may not parse the transform skip flag.

Embodiment 3-1

In one embodiment of the present invention, an encoder/decoder may determine signaling of a transform skip flag based on a primary transform flag with respect to the luma component. When a primary transform is applied, the encoder/decoder does not transform the transform skip flag of a luma component but may transform the transform skip flag of a chroma block.

FIG. 9 is a table illustrating whether to transmit a transform skip flag for each component according to whether a primary transform is applied, as an embodiment to which the present invention is applied.

Referring to FIG. 9, to avoid redundancy of syntax coding, in the case of a luma component, the transform skip flag is not signaled if the primary transform flag is not zero. In other words, if the transform flag which indicates whether to apply a primary transform is 0, the encoder may signal the transform skip flag to the decoder for all of the components. If the primary transform flag is 1, the encoder may signal the transform skip flag to the decoder with respect to the chroma component but may not signal the transform skip flag with respect to the luma component.

Embodiment 3-2

In one embodiment of the present invention, an encoder/decoder may determine signaling of transform skip flags for all of the components based on the primary transform flag.

In the video coding technology in which the transform skip flag is transmitted to each component unit, the structure of the luma component may be independent of the structure of the chroma component. For example, in the QTBT structure, the I-slice may be structurally independent while the B-slice may have a structural dependency.

FIG. 10 is a table illustrating whether to transmit a transform skip flag for each component according to whether a primary transform is applied, as an embodiment to which the present invention is applied.

Referring to FIG. 10, if component structures are independent from each other (for example, in the case of I-slice), an encoder may not signal the transform skip flag for all of the components when a primary transform is applied. By doing so, the amount of additional information to be transmitted may be reduced, and coding efficiency may be improved.

Embodiment 3-3

One embodiment of the present invention proposes a method for determining whether to transmit a transform skip flag with respect to a chroma component by an encoder/decoder when a primary transform is not applied.

The method described above may have various conditions for transmitting a transform skip flag. If it is assumed that signaling of a transform skip flag is limited to the case where the number of pixels in a block is 16 or less, the size of the chroma component may be 2×2, 2×4, 4×2, 8×2, or 4×4.

In this case, if the transform skip flag is transmitted even though the size of a block is excessively small, bit overhead may be increased. Therefore, to prevent the aforementioned problem, the transform skip flag may not be transmitted when the size of a chroma component block is smaller than the size under a specific condition or when the total number of pixels is smaller than a specific number.

For example, the encoder/decoder may determine whether to transmit the transform skip flag of the chroma component by using the condition of Eq. 6 as shown below.

$$((\text{Width} * \text{Height}) <= \text{Threshold}_{max}) \&\& \quad \text{[Eq. 6]}$$

$$((\text{Width} * \text{Height}) >= \text{Threshold}_{min}))$$

Referring to Eq. 6, the encoder/decoder may determine whether to transmit a transform skip flag only when the number of pixels of a chroma block belongs to a specific range. In Eq. 6, $\text{Threshold}_{max}$ represents an upper threshold value, and $\text{Threshold}_{min}$ represents a lower threshold. The $\text{Threshold}_{max}$ and $\text{Threshold}_{min}$ may be pre-configured for the encoder and decoder.

Similarly, for example, the encoder/decoder may determine whether to transmit the transform skip flag of the chroma component by using the condition expressed by Eq. 7 below.

$$\&\& (\text{width} \geq \text{blockSize}_{min} \&\& \text{Height} \geq \text{blockSize}_{min}) \quad \text{[Eq. 7]}$$

$$(\text{width} \leq \text{blockSize}_{max} \&\& \text{Height} \leq \text{blockSize}_{max})$$

Referring to FIG. 7, the encoder/decoder may determine whether to transmit a transform skip flag only when the width and height of a chroma block belong to a specific range. In Eq. 7, $\text{blockSize}_{max}$ represents the maximum block size (or length of one side of the maximum size block), and blockSize$_{min}$ represents the minimum block size 9 or length of one side of the minimum size block). The blockSize$_{max}$ and blockSize$_{min}$ may be pre-configured for the encoder and decoder.

The embodiments described above may be applied independently from each other or may be used in combination thereof.

Figure 11:
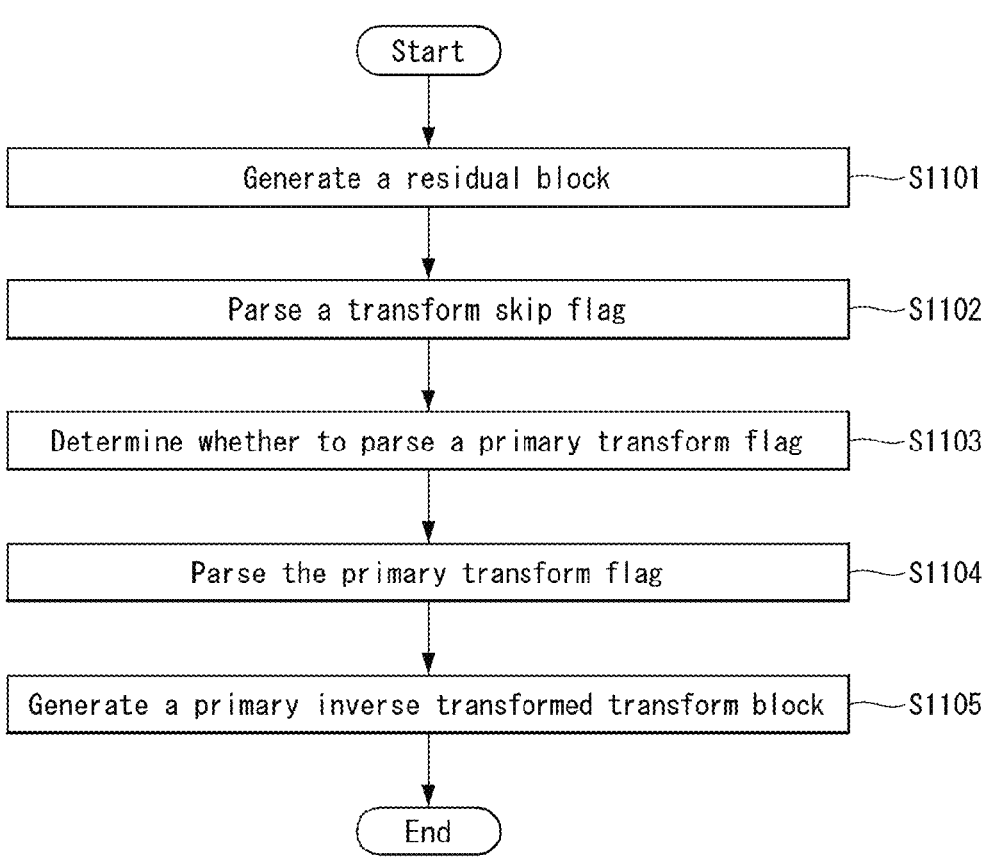
FIG. 11 illustrates a method for decoding a video signal according to one embodiment of the present invention.

FIG. 11 illustrates a method for decoding a video signal according to one embodiment of the present invention.

Although the present embodiment mainly describes a decoder for the sake of convenience, a method for decoding a video signal according to the present invention may be performed in the same way for both of an encoder and decoder.

A decoder generates a residual block of a current block by performing entropy decoding on a video signal S1101. More specifically, the decoder may extract quantized transform coefficients by performing entropy decoding on the bit stream received from an encoder and generate a two-dimensional array of quantized transform blocks by disposing the quantized transform coefficients according to a predetermined scan order. The decoder may generate dequantized transform blocks by performing dequantization on the quantized transform blocks.

When the size of a current block is smaller than a predetermined, first size, the decoder parses a transform skip flag which indicates whether a transform skip is applied to the current block S1102.

As described above, the decoder may determine whether a current block satisfies the first condition and if the currently processed block satisfies the first condition, parse the transform skip flag. Whether the first condition is satisfied may be determined according to the size of a currently processed block. In other words, if the size of the currently processed block is smaller than or equal to a predetermined size, the first condition may be satisfied. The predetermined first size may be determined on the basis of the width and height of the current block or the number of pixels within the current block.

The decoder determines whether to parse a primary transform flag which indicates whether a primary transform is applied to the current block S1103.

For example, the primary transform flag may be an AMT flag which indicates whether to apply AMT. If the AMT flag is 1, as described above, a step for parsing an AMT index may be added after the S1103 step.

As described above, if the transform skip flag is 0, the decoder may determine to parse the primary transform flag. Or if the size of the current block is smaller than a predetermined second size, and the value of the transform skip flag is 0, the decoder may determine to parse the primary transform flag.

Also, as described above, the encoder may signal to a decoder only when a transform skip is not applied to a component to which a primary transform is actually applied during a process for signaling a flag which indicates whether a primary transform is applied. At this time, if the current block is a luma block, size of the current block is smaller than the predetermined second size, and the value of the transform skip flag is 0, the decoder may determine to parse the primary transform flag.

Also, as described above, the encoder may signal a transform skip flag which indicates whether a transform skip is applied to a decoder only when the cbf value is 1. In this case, the decoder may check whether a non-zero transform coefficient exists in the current block. If it is determined from the checking result that a non-zero transform coefficient exists in the current block, the decoder may parse the transform skip flag.

Also, as described above, the primary transform flag may be entropy-decoded by referencing context determined according to depth of the current block, size of the current block, or number of pixels within the current block in the QuadTree plus BinaryTree (QTBT) block split structure. As described in Eq. 5 above, context used for entropy coding of a current flag may be expressed by a function of QT and BT depths.

If the decoder determines to parse the primary transform flag, the decoder parses the primary transform flag S1104.

Also, when performing CABAC on a flag which determines on/off of a primary transform, an encoder/decoder may determine context by using the size information of a currently processed block.

If the primary transform flag indicates that a primary transform is applied to the current block, the decoder generates a primary inverse transformed transform block of the current block by performing a primary inverse transform to the residual block S1105.

When a secondary transform is applied to the current block, the residual block may be a transform block to which the secondary transform has been applied. In this case, the decoder may perform a secondary inverse transform before performing the primary inverse transform. For example, the secondary inverse transform may be performed by using any one of the Discrete Cosine Transform (DCT), Discrete Sine Transform (DST), Karhunen Loeve Transform, graph-based transform, or non-separable secondary transform (NSST).

FIG. 12 illustrates a method for decoding a video signal according to one embodiment of the present invention.

A decoder generates a residual block of a current block by performing entropy decoding on a video signal S1201. More specifically, the decoder may extract quantized transform coefficients by performing entropy decoding on the bit stream received from an encoder and generate a two-dimensional array of quantized transform blocks by disposing the quantized transform coefficients according to a predetermined scan order. The decoder may generate dequantized transform blocks by performing dequantization on the quantized transform blocks.

The decoder parses a primary transform flag which indicates whether a primary transform is applied to a current block S1202. For example, the primary transform flag may be an AMT flag which indicates whether to apply AMT. If the AMT flag is 1, as described above, a step for parsing an AMT index may be added after the S1202 step.

The decoder checks whether the current block satisfies a predetermined specific condition S1203.

As described above, the specific condition may include whether the primary transform flag is 0 and whether size of the current block is smaller than or equal to the maximum size to which a transform skip is applied. At this time, the maximum size to which the transform skip is applied may be determined according to a slice of the current block. Or, the specific condition may further include whether the current block is a chroma component. Or, the specific condition may further include whether a slice of the current block is a B-slice. Or, the specific condition may further include whether size of the current block or number of pixels of the current block belongs to a specific range.

If it is determined from the checking result that the specific condition is satisfied, the decoder parses a transform skip flag which indicates whether a transform skip is applied to the current block S1204.

If the transform skip flag indicates that a transform skip is not applied to the current block, the decoder generates a primary inverse transformed transform block of the current block by performing a primary inverse transform on the residual block S1205.

When a secondary transform is applied to the current block, the residual block may be a transform block to which the secondary transform has been applied. In this case, the decoder may perform a secondary inverse transform before performing the primary inverse transform. For example, the secondary inverse transform may be performed by using any one of the Discrete Cosine Transform (DCT), Discrete Sine Transform (DST), Karhunen Loeve Transform, graph-based transform, or non-separable secondary transform (NSST).

FIG. 13 illustrates an apparatus for decoding a video signal according to one embodiment of the present invention.

Although FIG. 13 illustrates a residual block generating unit 1301, primary transform flag parsing unit 1302, condition checking unit 1303, transform skip flag parsing unit 1304, and transform block generating unit 1305 as separate blocks for the convenience of descriptions, the individual units may also be implemented as being included in an encoder and/or decoder.

Referring to FIG. 13, the decoding apparatus implements the functions, processes and/or methods proposed in FIGS. 5 to 15 above. More specifically, the decoding apparatus may be constructed by including the residual block generating unit 1301, primary transform flag parsing unit 1302, condition checking unit 1303, transform skip flag parsing unit 1304, and transform block generating unit 1305.

The residual block generating unit 1301 generates a residual block of a current block by performing entropy decoding on a video signal S1101. More specifically, the residual block generating unit 1301 may extract quantized transform coefficients by performing entropy decoding on the bit stream received from an encoder and generate a two-dimensional array of quantized transform blocks by disposing the quantized transform coefficients according to a predetermined scan order. The residual block generating unit 1301 may generate dequantized transform blocks by performing dequantization on the quantized transform blocks.

The primary transform flag parsing unit 1302 parses a primary transform flag which indicates whether a primary transform is applied to the current block. For example, the primary transform flag may be an AMT flag which indicates whether to apply AMT. If the AMT flag is 1, as described above, the primary transform flag parsing unit 1302 may parse the AMT index additionally after parsing the AMT flag.

The condition checking unit 1303 checks whether the current block satisfies a predetermined specific condition.

As described above, the specific condition may include whether the primary transform flag is 0 and whether size of the current block is smaller than or equal to the maximum size to which a transform skip is applied. At this time, the maximum size to which the transform skip is applied may be determined according to a slice of the current block. Or, the specific condition may further include whether the current block is a chroma component. Or, the specific condition may further include whether a slice of the current block is a B-slice. Or, the specific condition may further include whether size of the current block or number of pixels of the current block belongs to a specific range.

If it is determined from the checking result that the specific condition is satisfied, the transform skip flag parsing unit 1304 parses a transform skip flag which indicates whether a transform skip is applied to the current block.

If the transform skip flag indicates that a transform skip is not applied to the current block, the transform block generating unit 1305 generates a primary inverse transformed transform block of the current block by performing a primary inverse transform on the residual block.

When a secondary transform is applied to the current block, the residual block may be a transform block to which the secondary transform has been applied. In this case, the decoder may perform a secondary inverse transform before performing the primary inverse transform. For example, the secondary inverse transform may be performed by using any one of the Discrete Cosine Transform (DCT), Discrete Sine Transform (DST), Karhunen Loeve Transform, graph-based transform, or non-separable secondary transform (NSST). And the decoder may generate a residual block by performing a primary inverse transform to a second inverse transformed transform block.

In the aforementioned embodiments, the elements and characteristics of the present invention have been combined in specific forms. Each of the elements or characteristics may be considered to be optional unless explicitly described otherwise. Each of the elements or characteristics may be implemented in a form not combined with another element or characteristic. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

As described above, the preferred embodiments of the present invention have been disclosed for illustrative purposes, and those skilled in the art may improve, change, substitute, or add various other embodiments without departing from the technological spirit and scope of the present invention disclosed in the attached claims.

What is claimed is:

1. A method for decoding a video signal, comprising:

parsing a first transform skip flag specifying whether a transform is applied to coefficients of a current block based on a size of the current block being smaller than a first predetermined size;

obtaining an index specifying one of a plurality of transform kernel combinations to be applied to the coefficients of the current block based on the size of the current block being smaller than a predetermined second size and the first transform skip flag being 0, each transform kernel combination comprising a transform kernel in a horizontal direction and a transform kernel in a vertical direction; and performing an inverse transform on the coefficients of the current block based on the transform kernel combination specified by the index to generate residual samples of the current block, wherein the obtaining of the index further comprises checking whether a non-zero transform coefficient exists in the current block, and wherein the index is obtained further based on a determination from the checking result that the non-zero transform coefficient exists in the current block.

2. The method of claim 1, wherein a different transform kernel combination is applied to each of intra-prediction mode groups.

3. The method of claim 2, wherein intra-prediction modes are grouped into prediction mode groups, and a transform kernel combination is determined to be applied for each of the prediction mode groups.

4. The method of claim 1, wherein the transform kernel combination is determined further based on an intra-prediction mode.

5. The method of claim 1, wherein the obtaining of the index further comprises checking a value of an index flag related to obtaining the index based on the first transform skip flag being 0, wherein the index is obtained further based on the value of the index flag being 1, and wherein the index is derived to specify the transform kernels in the horizontal and vertical directions as a same transform kernel based on the value of the index flag being 0.

6. A method of encoding a video signal, comprising:

generating residual samples of a current block;

generating a first transform skip flag specifying whether a transform is applied to the residual samples of the current block based on a size of the current block being smaller than a predetermined first size;

performing a transform to the residual samples of the current block based on one among transform kernel combinations to obtain transform coefficients of the current block, each transform kernel combination comprising a transform kernel in a horizontal direction and a transform kernel in a vertical direction; and generating an index specifying the one among a plurality of transform kernel combinations, based on the size of the current block being smaller than a predetermined second size and the first transform skip flag being 0, wherein the generating of the index further comprises checking whether a non-zero transform coefficient exists in the current block, and wherein the index is generated further based on a determination from the checking result that the non-zero transform coefficient exists in the current block.

7. The method of claim 6, wherein a different transform kernel combination is applied to each of intra-prediction mode groups.

8. The method of claim 7, wherein intra-prediction modes are grouped into prediction mode groups, and a transform kernel combination is determined to be applied for each of the prediction mode groups.

9. The method of claim 6, wherein the transform kernel combination is determined further based on an intra-prediction mode.

10. The method of claim 6, wherein the generating of the index further comprises generating an index flag related to generating the index based on the first transform skip flag being 0, wherein the index is generated further based on a value of the index flag being 1; and wherein the index is derived to specify the transform kernels in the horizontal and vertical directions as a same transform kernel based on the value of the index flag being 0.

11. An apparatus for decoding a video signal, comprising:

a memory configured to store the video signal; and a processor coupled with the memory, wherein the processor is configured to:

parse a first transform skip flag specifying whether a transform is applied to coefficients of a current block based on a size of the current block being smaller than a first predetermined size;

obtain an index specifying one of a plurality of transform kernel combinations to be applied to the coefficients of the current block based on the size of the current block being smaller than a predetermined second size and the first transform skip flag being 0, each transform kernel combination comprising a transform kernel in a horizontal direction and a transform kernel in a vertical direction; and perform an inverse transform on the coefficients of the current block based on the transform kernel combination specified by the index to generate residual samples of the current block, wherein the obtaining of the index further comprises checking whether a non-zero transform coefficient exists in the current block, and wherein the index is obtained further based on a determination from the checking result that the non-zero transform coefficient exists in the current block.

12. The apparatus of claim 11, wherein a different transform kernel combination is applied to each of intra-prediction mode groups.

13. The apparatus of claim 12, wherein intra-prediction modes are grouped into prediction mode groups, and a transform kernel combination is determined to be applied for each of the prediction mode groups.

14. The apparatus of claim 11, wherein the transform kernel combination is determined further based on an intra-prediction mode.

15. The apparatus of claim 11, wherein the obtaining of the index further comprises checking a value of an index flag related to obtaining the index based on the first transform skip flag being 0, wherein the index is obtained further based on the value of the index flag being 1, and wherein the index is derived to specify the transform kernels in the horizontal and vertical directions as a same transform kernel based on the value of the index flag being 0.

16. An apparatus for encoding a video signal, comprising:
a memory configured to store the video signal; and
a processor coupled with the memory, wherein the processor is configured to:
 generate residual samples of a current block;
 generate a first transform skip flag specifying whether a transform is applied to the residual samples of the current block based on a size of the current block being smaller than a predetermined first size;
 perform a transform to the residual samples of the current block based on one among transform kernel combinations to obtain transform coefficients of the current block, each transform kernel combination comprising a transform kernel in a horizontal direction and a transform kernel in a vertical direction; and
 generate an index specifying the one among a plurality of transform kernel combinations, based on the size of the current block being smaller than a predetermined second size and the first transform skip flag being 0, wherein the generating of the index further comprises checking whether a non-zero transform coefficient exists in the current block, and wherein the index is generated further based on a determination from the checking result that the non-zero transform coefficient exists in the current block.

17. The apparatus of claim 16, wherein a different transform kernel combination is applied to each of intra-prediction mode groups.

18. The apparatus of claim 17, wherein intra-prediction modes are grouped into prediction mode groups, and a transform kernel combination is determined to be applied for each of the prediction mode groups.

19. The apparatus of claim 16, wherein the transform kernel combination is determined further based on an intra-prediction mode.

20. A non-transitory computer readable storage medium, storing computer programs and a bitstream, wherein when executed by a processor, the computer programs cause the processor to perform the method of claim 6 to generate the bitstream.

\* \* \* \* \*